(12) United States Patent
Berger

(10) Patent No.: US 9,632,009 B2
(45) Date of Patent: Apr. 25, 2017

(54) METHOD FOR FUNCTIONALLY TESTING TURBOMACHINES, AND TEST DEVICE THEREFOR

(75) Inventor: Hartmut Berger, Bremen (DE)

(73) Assignee: AVL List GmbH, Graz (AT)

( * ) Notice: Subject to any disclaimer, the term of this patent is extended or adjusted under 35 U.S.C. 154(b) by 590 days.

(21) Appl. No.: 14/001,424

(22) PCT Filed: Feb. 22, 2012

(86) PCT No.: PCT/EP2012/053013
§ 371 (c)(1),
(2), (4) Date: Sep. 20, 2013

(87) PCT Pub. No.: WO2012/113831
PCT Pub. Date: Aug. 30, 2012

(65) Prior Publication Data
US 2014/0007663 A1     Jan. 9, 2014

(30) Foreign Application Priority Data
Feb. 24, 2011   (AT) .................................. A 251/2011

(51) Int. Cl.
*G01M 15/04*   (2006.01)
*G01M 15/14*   (2006.01)
*G01M 15/09*   (2006.01)

(52) U.S. Cl.
CPC ............ *G01M 15/14* (2013.01); *G01M 15/09* (2013.01)

(58) Field of Classification Search
CPC .............................. G01M 15/14; G01M 15/04
USPC ..... 73/112.05, 112.06, 118.01, 118.02, 37.5, 73/37.6, 49.4, 49.7, 49.8
See application file for complete search history.

(56) References Cited

U.S. PATENT DOCUMENTS

| | | | | |
|---|---|---|---|---|
| 6,962,043 B2* | 11/2005 | Venkateswaran | ..... | F01D 17/085 60/39.091 |
| 7,278,302 B2* | 10/2007 | Rohde | ..... | F02B 37/00 73/114.01 |
| 7,380,445 B2* | 6/2008 | Wood | ..... | F04D 27/001 73/114.39 |
| 7,469,577 B2* | 12/2008 | Barton | ..... | G01M 15/09 73/114.77 |
| 7,522,988 B2* | 4/2009 | Garcia | ..... | G01M 15/05 701/111 |
| 7,681,440 B2* | 3/2010 | Thomassin | ..... | G01M 15/14 73/112.05 |
| 7,853,395 B2* | 12/2010 | Guo | ..... | F02D 41/1497 701/102 |

(Continued)

FOREIGN PATENT DOCUMENTS

| | | |
|---|---|---|
| DE | 102008031274 | 10/2009 |
| EP | 1426578 | 6/2004 |

OTHER PUBLICATIONS

English Abstract of EP 1426578.
English Abstract of DE 102008031274.

*Primary Examiner* — Michael A Lyons
*Assistant Examiner* — Hoang Nguyen
(74) *Attorney, Agent, or Firm* — Dykema Gossett PLLC

(57) ABSTRACT

Functional faults of a turbo-machine are determined by operating the turbo-machine as a test object in a test stand using one or more gas pressure pulses which are not superimposed onto a substantially constant gas flow and detecting dynamic behavior of the test object using measuring devices, a measuring and control system and an evaluation unit.

31 Claims, 1 Drawing Sheet

(56) References Cited

U.S. PATENT DOCUMENTS

2002/0156568 A1\* 10/2002 Knott .................. G01M 15/102
                                                                        701/114
2010/0131212 A1\* 5/2010 Heinkele ............. F02D 41/2451
                                                                        702/47

\* cited by examiner

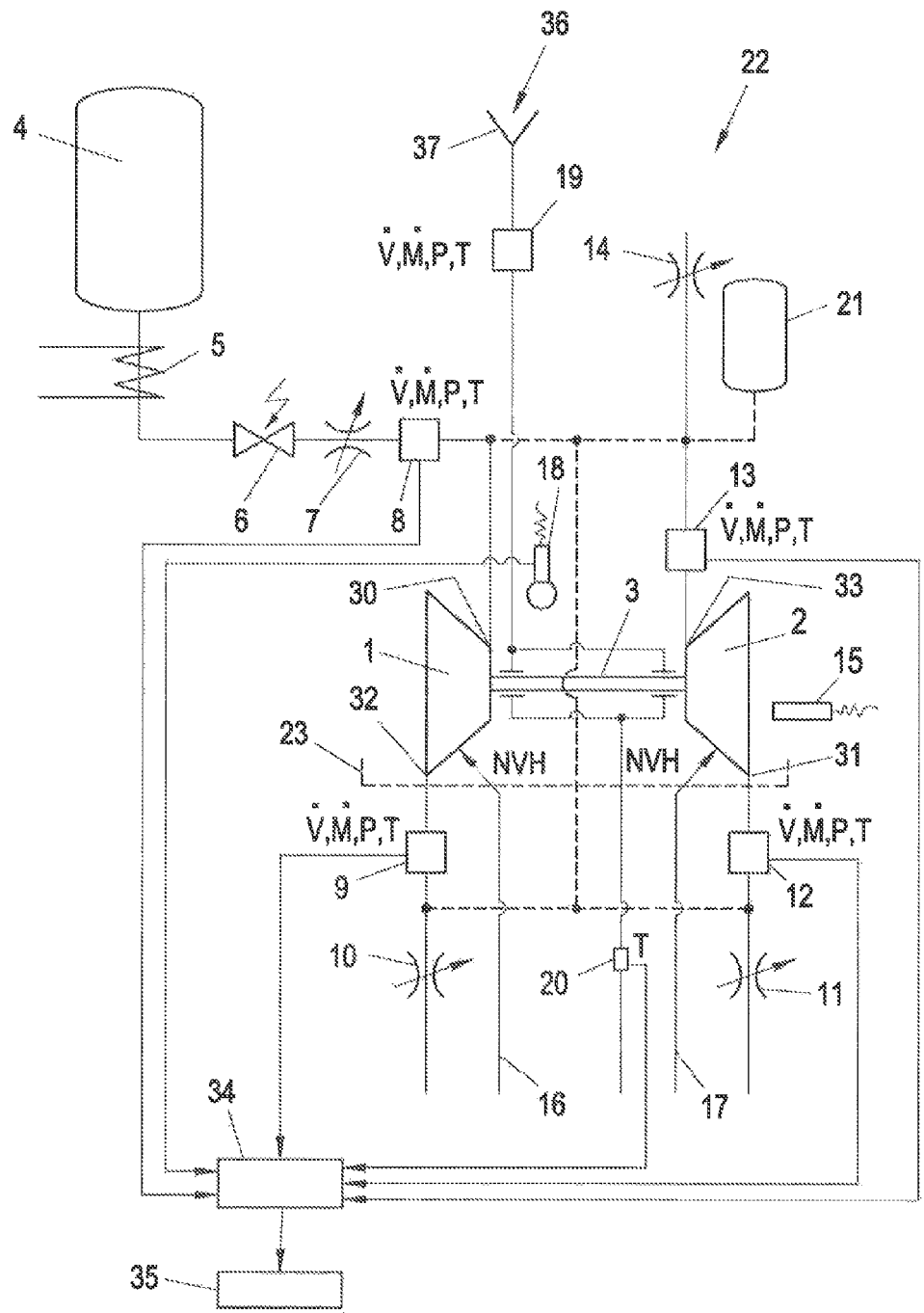

METHOD FOR FUNCTIONALLY TESTING TURBOMACHINES, AND TEST DEVICE THEREFOR

BACKGROUND OF THE INVENTION

Field of the Invention

The invention relates to a method for the functional testing of turbo-machines, preferably exhaust gas turbo-chargers, wherein the test object is subjected to pressurized gas and is operated thereby, and to a testing device for turbo machines, preferably exhaust gas turbo-chargers, comprising a receptacle for the test object, a source for pressurized gas, preferably compressed air, to which the test object can be connected, and an evaluation unit.

The Prior Art

The systematic integration of quality assurance test stands (function test stands) in the production process of engines, transmissions and other aggregates in the automotive industry has been common practice for many years. The requirements of consumers and the legislation result in the demand for increasingly efficient engines for which, among other things, charging by means of mechanical chargers or turbo-driven chargers is used. Therefore, suitable test methods were sought also for these components. In principle, turbo-machines are rotating machines which are structured in a simple manner and, compared to, e.g., a combustion engine, have few rotating parts. Greatly simplified, it can be assumed that the machine is "OK" if it is freely rotatable. However, in practice, many problems still occur as demonstrated, e.g., by the automobile manufacturers' error statistics for the turbochargers used or by the percentage of repairs in the operational test stands of the turbine manufacturers, which in some cases is very high. Due to the function of these fluid-flow machines, it has previously been assumed that a meaningful test of the machines is possible only near the normal operating points which requires large gas mass flows which, in addition, have to be heated (in the case of gas turbines) or are heated by the machine (in the case of turbo-compressors). The result of these requirements normally is a "classical" hot test stand in which the machines are tested in the operating range. The great disadvantages of this test at the end of the production process are late error detection, increased repair cost due to additional teardown and setup processes, increased operating costs due to multiple tests in case of an error, the risk of significant machine breakdown due to subsequent damages triggered by errors, risk of injury due to hot components and holding times for cooling the test object before fault diagnosis and fault correction can be started.

In order to avoid these problems it was a tempted in the past to perform testing of turbo-machines with compressed gas (compressed air). In doing so, it is attempted to simulate the operating points occurring in a normal operation as good as possible with a stationary gas mass flow. Due to the high energy input necessary for generating large gas mass flows, this kind of testing did not yet become widely accepted.

In the case of aircraft engines, a final testing of the completed turbo-machine takes place in most cases under operating conditions at full load, whereas in the case of high-volume products such as turbochargers for automobile engines, many times a delivery to the customer of the untested turbo-machine takes place because a complete test of all parts under operating conditions would not be economical. In EP 1 426 578 B1, a cold functional test of turbochargers in the installed state on a combustion engine is described wherein said test, just as testing under operating conditions, has the disadvantage of a late error detection. This late error detection results in the best case in increased repair costs (additional teardown and setup processes in the test stand, additional work steps during the repair due to disassembly/assembly of additional parts, re-testing after the repair) and in the worst case in serious damage to the turbo-machine due to subsequent damage triggered by the error. Therefore, there was still the demand for a cost-effective testing method which is safe in all aspects because a 100% hot testing of all turbocharger seems not to be feasible for economic reasons.

WO 2008/005679 A2 describes a method and an apparatus by means of which the performance data of a turbocharger are to be checked by testing at one or a plurality of individual operating points (single test condition). This test is intended to provide a direct comparison of operating points of the normal operation with the ones from a test stand and therefore to achieve measurement results in the test station which are comparable to the ones from a normal operation. However, no precautions are taken so as to be able to identify possible error causes through a specific adjustment of the test parameters and the operation at the borderline or outside of the normal operating range.

DE 102008031274 B3 discloses a method and a device for determining the characteristic map of a turbocharger. In the described method, an adjustable pulsation is superimposed on a constant hot gas mass flow so as to simulate in this manner the behavior of a combustion engine having one or a plurality of cylinders and therefore to be able to determine a more realistic characteristic map. The background of the method is the operation of the turbocharger with the so-called "pulse-charging" which utilizes the energy of the exhaust gas pulse when the exhaust gas valve opens. However, the principle of the test described therein does not serve for fault diagnosis or functional testing, but for determining the most realistic characteristic map on a hot gas test stand.

It was therefore an object of the present invention to provide a method and a testing device for turbo-machines which allow a simple, economical and still informative testing of these components.

SUMMARY OF THE INVENTION

In order to achieve this object, the method is characterized according to the invention in that the test object is integrated in a testing device and is subjected by means of this testing device only in a pulse-like manner to a gas, preferably compressed air, wherein from the dynamic behavior of the test object resulting from the at least one gas pressure pulse, potential errors can be determined. Thus, hot testing as well as testing for stationary operating points by means of compressed gas can be abstained from. Instead, as a basis, rotational testing with a gas pressure pulse in connection with a dynamic measured data acquisition and evaluation is carried out, which enables an early and cost-effective error detection. The term "pressure pulse" is defined according to the usual definition as a short-time pressure increase and decrease or vice versa, in contrast to known testing methods which work with constant gas flows. Preferably, the test object is subjected to at least two gas pressure pulses, optionally with different energy content.

According to an advantageous embodiment variant, the energy content of at least one gas pulse can be increased by an additional heating or fire-heating.

Another embodiment variant of the method is characterized in that the test object is operated in the normal operating direction in that a gas intake or optionally all gas intakes into the test object are subjected to the gas pressure pulse.

Another variant for rotational testing is characterized in that by subjecting the gas discharge or each gas discharge to at least one gas pressure pulse, the test object is operated in a flow direction opposite to the normal operating direction.

Advantageously, for a more accurate adjustment with regard to the respective test object or the actual testing task, the gas pressure pulse at or near the test object can be throttled in a variable manner.

In a similar manner, adjusting the testing can be carried out in that a gas flow from the test object, which gas flow is caused by actuating the test object by means of the gas pressure pulse and is separate from the latter, is throttled at or near the test object, preferably in a variable manner.

A further embodiment of the invention provides that in addition to the rotational testing, preferably before carrying out said testing, further tests take place, for example a completeness and/or dimension check, a mechanical, acoustic, optical and/or visual check, a leak test of the test object for internal and/or external leaks, a flow test of the lubrication system with a test gas, preferably with air, or a testing of the sensors and actuators belonging to the test object takes place, wherein preferably the actuators belonging to the test object are subjected to additional forces and/or the sensors belonging to the test object are subjected to external signals.

Preferably, prior to the test run, an automated identification at least of the product type of the test object is carried out by the measuring and/or control system of the testing device and subsequently, the test run is performed depending on the result of the identification, and the identification of the product type is preferably performed by detecting physical properties of the test object such as, for example, size, weight or shape, or the identification of the product type or the test object itself is performed by scanning or identifying an individual marking, or the identification of the product type or the test object itself is derived by electronic information from the process control system.

Another embodiment of the invention provides that by means of a connection of at least some sensors and actuators of the test object and at least some sensors and actuators of the test stand to at least one measuring and/or control system, an at least partially automated process flow of the test takes place, wherein an optionally variable testing program is passed through, and wherein preferably at least some of the measured values are partially or fully automatically collected, stored and are made available for a manual and/or automatic evaluation.

Advantageously, it can be provided that the test run is performed variably depending on the result of one or a plurality of previous tests and/or depending on the ambient conditions.

A further advantageous variant is characterized in that an automatic evaluation of the test results is carried out with regard to deviations from specifiable fixed values or, depending on the result of one or a plurality of previous tests and/or ambient conditions, from variable values, that the test object is classified accordingly and the test results are preferably stored and/or displayed, wherein preferably individual or all test parameters used and measurement and evaluation results used are locally stored in connection with a unique identification marking of the test object in the testing device and/or in a superordinated system.

Preferably, an automatic evaluation of the test results with regard to possible causes of deviations from the normal state is carried out, and corresponding information for eliminating the deviations is output and stored and/or displayed together with the test results.

It can be provided here that at least one measured value is recorded in a dynamic time-based, dynamic speed-based or dynamic rotation-angle-based manner.

A further alternative embodiment variant of the invention is characterized in that the test object is operated with the external lubricant supply being turned off.

As an alternative, lubricating the test object can be carried out with a lubricant which is adapted to the test and is fed with constant technical properties or is conditioned according to the test requirements. By using oils with lower or higher viscosity at temperatures which are freely selectable for the test, the oil viscosity present in the normal state at the typical operating temperature can be reproduced or can be changed in such a manner that errors in the lubricating system and/or the bearing can be diagnosed more accurately. The required properties of the lubricant arise from the test conditions, in particular substantially from the speeds reached during the test run and the product specific requirements. By means of adequate conditioning, a desired lubricant temperature can be set, which in connection with the specific selected lubricant, provides for the desired viscosity.

For this, it is preferably provided that the lubricant fed to the test object is monitored, for example, the lubricant's volume flow and/or mass flow or the temperature of the lubricant discharging from the test object is detected and evaluated.

A particularly advantageous embodiment of the invention is characterized in that detecting the rotational speed and/or detecting the rotation angle of the test object takes place by means of a non-contact method, for example optically, magnetically, acoustically, electromagnetically, or radio-electrically, and preferably with a resolution high enough that the individual turbine and/or compressor blades can be identified over the entire speed range of the testing task.

Preferably, volume flow and/or mass flow and/or temperature and/or pressure of the gas pressure pulse at the gas inlet and/or gas outlet of the test object are preferably measured dynamically.

Also, structure-borne noise and air-borne noise emissions at one or a plurality of positions on the test object and/or in the test stand can be detected statically and/or dynamically, and optionally also in a non-contact manner.

Also possible is a preferably dynamic measurement of volume flow and/or mass flow and/or temperature and/or pressure of the gas at the inlet and/or outlet of a second machine, for example a compressor, that is mechanically coupled with the test object.

For the testing device as described above, the given object is achieved according to the invention in that the source for acting on the gas intake or on each gas intake into the test object, where applicable alternatively or additionally also on the gas discharge or on each gas discharge, is designed for at least one gas pressure pulse, and that in the evaluation unit, the dynamic behavior of the test object resulting from the compressed air pulse is monitored and errors are determined therefrom.

One advantageous embodiment of the invention is characterized in that the source for acting on the test object is designed for at least two gas pressure pulses, optionally with different energy content.

Preferably, an additional device for heating or fire-heating the pressurized gas is provided.

Furthermore, advantageously, a preferably adjustable throttle device for the pressurized gas can be provided at or near the gas intake or each gas intake into the test object, and/or at or near the possible gas discharge or each gas discharge from the test object.

Advantageously, further testing devices can be provided, for example a completeness and/or dimension check, a mechanical, acoustic, optical and/or visual check, a leak test of the test object for internal and/or external leaks, a flow test of the lubrication system with a test gas, preferably with air, or a test of the sensors and actuators belonging to the test object, preferably by applying external forces and/or signals.

A testing device according to the invention can also be characterized in that devices for automated identification of at feast the product type of the test object are integrated in the measuring and/or control system of the testing device, and that preferably a process flow is implemented in the control system of the testing device, through which process flow, the test run is carried out depending on the result of the identification.

For this, preferably, devices are provided for identifying the product type preferably by detecting physical properties of the test object such as, for example, size, weight or shape, or by scanning or identifying an individual marking, or by electronic information from the process control system.

Advantageously, the testing device can also have the features that at least some sensors and actuators of the test object and at least some sensors and actuators of the test stand are connected to at least one measuring and/or control system in which an at least partially automated process flow of the test is implemented, wherein at least some of the measured values are partially or fully automatically collected, stored and are made available for a manual and/or automatic evaluation.

According to a possible embodiment of the testing device, a system is provided for supplying the test object with a lubricant adapted to the test, optionally comprising a conditioning system for the lubricant.

Such an embodiment is advantageously in addition characterized in that devices are provided for monitoring the lubricant fed to the test object, for example the lubricant's volume flow and/or mass flow or the temperature of the lubricant discharging from the test object.

Another alternative embodiment of the invention is characterized in that devices are provided for non-contact and preferably high-resolution detection of rotational speed and/or rotation angle of the test object, for example by means of optical, magnetic, acoustic, electromagnetic or radioelectric sensors.

Also, devices for preferably dynamically determining the volume flow and/or mass flow and/or the temperature and/or the pressure of the gas pressure pulse at the gas inlet and/or the gas outlet of the test object, and/or optionally non-contact devices for determining structure-borne noise and/or air-borne noise emissions at one or a plurality of locations on the test object and/or in the test stand can be provided.

In the following description the invention is explained in more detail with reference to the attached FIGURE.

BRIEF DESCRIPTION OF THE FIGURE

The attached FIGURE shows a schematic diagram of a testing device according to the invention for turbo-machines.

DETAILED DESCRIPTION OF THE PREFERRED EMBODIMENTS

The method and the devices described hereinafter enable the reliable, early and cost-effective detection of errors in turbo-machines which hereinafter are alternatively also designated as test object. The term turbo-machine comprises here all types of turbines which convert the energy of a gaseous or liquid energy carrier into mechanical energy, and all types of rotating compressors or pumps which convert mechanical energy into gas energy or fluid energy. Combinations of these machines coupled directly or mechanically via a gear unit are also covered by the term test object within the context of the present invention, regardless of whether this involves, for example, turbochargers for combustion engines or turbo-engines for aircraft. The features explained below can be used for all types of the mentioned test objects, individually and in combinations thereof.

Turbo-machines tested according to the described methods can subsequently be tested under operating conditions (performance certification) without having to worry about malfunctions. Thereby, test procedures can be shortened and multi-occupancy with faulty and subsequently repaired turbo-machines can be avoided, which results in a significantly improved efficiency of the testing system which often comprises a plurality of test stands. In high-volume productions, the turbo-machines tested according to the described methods can be mainly delivered without a final test under operating conditions. For a reliable quality assurance, random checks of the performance and/or emission data according to established rules of statistical quality control (SPC) are sufficient. With respect to the previous mostly untested delivery of turbo-machines, a significant quality improvement and traceability of the produced turbo-machines is achieved with the described methods. Compared to testing the turbo-machines under operating conditions, considerable savings of energy, working hours and investment can be achieved.

For example, a compressor 2 is mechanically coupled via the mechanical connection 3 to a turbine 1 wherein here, this entire arrangement represents the test object on receptacle 23. For driving the test object 1, 2, 3 within the context of the functional testing according to the invention, a short-time gas pressure pulse from a gas pressure source 4 is used and the resulting dynamic behavior of the test object 1, 2, 3 is used for error detection. For this, preferably, compressed air is used; however, if required, other gases can also be used. A gas pressure vessel located near the testing device (stand) 22 and adapted to the required test usually serves as a gas pressure source 4, wherein said testing device can be a part of a system consisting of a plurality of preferably cross-linked testing devices.

Typically, the test object 1, 2, 3 is subjected exclusively to clearly defined, short-term pulses of the respective gas which are not superimposed onto an otherwise substantially constant gas flow. Advantageously, more than only a single gas pressure pulse is used for the test, wherein preferably at least two, optionally a plurality of gas pressure pulses with different energy content are used. The energy content of any gas pressure pulse acting on the test object can be increased by additional heating or fire-heating by means of, for instance, ages heating system 5.

The gas pressure pulse driving the test object 1, 2, 3 can be controlled via the valve 6 and can preferably be throttled via a throttle device 7 at or near the gas inlet of the test object 1, 2, 3, wherein the throttle device 7 is preferably configured to be adjustable. With a measuring device 8 for the mass flow and/or volume flow and/or pressure and/or temperature at the gas inlet 30, 31 of the test object 1, 2, 3, and a measuring device 9 for the mass flow and/or volume flow and/or pressure and/or temperature at the gas outlet 32, 33 of the test object 1, 2, 3, corresponding measured values are determined and transmitted to the evaluation unit 35 of the test stand.

As described above for the gas inlet, the gas discharge from the test object 1, 2, 3 at or near the outlet can also be throttled statically or variably, for which purpose the preferably adjustable throttle device 10 is provided.

However, influencing the rotating movement of the test object along with information about its state is also possible through the mechanically coupled machine 2. In order to be able to accurately control this influence, according to one exemplary embodiment of the invention, the gas intake into this machine 2, which is mainly configured as a compressor, is statically or variably throttled. For this purpose, a preferably adjustable throttle device 11 is provided at the gas inlet of the machine 2 which is coupled, for example, via a shaft or a gear unit serving as a mechanical connection 3. Here too, advantageously at least one measuring device 12 for the mass flow and/or volume flow and/or pressure and/or temperature at the gas inlet of the coupled machine 2, and also at least one measuring device 13 for the mass flow and/or volume flow and/or pressure and/or temperature at the gas outlet of the coupled machine 2 can be provided. A particularly fine adjustment is possible if via a preferably adjustable throttle device 14, the gas discharge from the machine 2 at the gas outlet of this machine 2 is preferably variably throttled.

In general, it is possible to act indirectly via the mechanically coupled machine 2 on the test object 1, 2, 3, which, however, can also be done via gas pressure pulses which act in addition in a driving and/or decelerating manner on the machine 2. For this purpose, a rigid or flexible gas storage 21 adapted to the test can be connected to or in the proximity of one or a plurality of gas inlets and/or outlets of the coupled machine 2. If needed, the gas pressure source 4 can in addition be used as a gas pressure source 4 for the machine 2.

However, the gas pressure source 4 can act not only on the gas inlet of the test object 1, 2, 3, but also on the gas outlet of the same so that the test object 1, 2, 3, if needed, can also be operated in the opposite flow direction.

As already mentioned above, one or a plurality of the described testing devices can be integrated in the production process of the turbo-machines. Instead of a manual loading and unloading or adapting and deadapting of the testing device, which is also possible, of course, it is advantageously provided that the test objects 1, 2, 3 are fed partially or fully automated to or away from the testing device by means of a conveying system. Also, assembly and disassembly and/or adaptation and deadaptation of the test objects 1, 2, 3 in the test stand is preferably carried out in a partially and/or fully automated manner. In doing so, advantageously, all processes for loading and unloading as well as for assembly/disassembly and adaption/deadaptation are monitored by a control system 34 and/or controlled in a partially or fully automated manner.

Through the control system of the test stand or the entire installation, advantageously, the exact product type of the test object 1, 2, 3 is determined before and/or during the delivery and the subsequent process of assembly/disassembly, adaptation/deadaptation and of course also the testing are adapted accordingly. Determining the type can take place by detecting physical properties of the test object 1, 2, 3 itself (e.g., size, weight, shape or special markings) as well as by requesting and/or providing mechanical or electronic information (e.g., mechanical coding, data carrier or superordinated computer) or by a combination of these possibilities.

Prior to the rotating test, expediently, a completeness check and/or dimension check is performed with suitable test methods (e.g., mechanically, acoustically, optically and/or visually (camera system)) and likewise, advantageously, a leak test of one or a plurality of chambers of the machine for internal and/or external leaks is performed. Further additional method steps can include that prior to and/or during the rotating test, the sensors and actuators belonging to the test object are tested and/or actuated, that prior to and/or during the rotating test, the actuators belonging to the test object 1, 2, 3 are subjected to additional forces, and/or that prior to and/or during the rotating test, the sensors belonging to the test object are subjected to external signals.

For the actual testing of the turbo-machine, it is advantageously provided that individual or all sensors and actuators of the test object 1, 2. 3 as well as all sensors and actuators of the test stand are connected to one or a plurality of measuring and/or control systems 34 which monitor and control the partially or fully automated process flow of the testing. The in each case active measuring and/or control system can perform a partially or fully automated testing of the test object according to a predefined and/or variable testing program (e.g., In dependence on previous test results from other tests stands and/or previous tests in the same test stand and/or ambient conditions). The resulting measured values are partially or fully automatically collected by the one or the plurality of measuring and/or control systems, optionally stored and/or are made available for a manual and/or automatic evaluation. Some or all measured values can be recorded time-based in a static as well as dynamic manner and, alternatively or additionally, can also be recorded statically as well as dynamically in speed-based and/or rotation angle-based a manner.

Particularly advantageous is a non-contact recording of the rotational speed of the test object 1, 2, 3 via the non-contact speed sensor 15, for example optically, magnetically, acoustically, electromagnetically (eddy current), or radioelectrically (radar). Preferably, recording the rotational speed is carried out with a resolution high enough that the individual turbine and/or compressor blades can be identified over the entire speed range of the testing task.

Also, the volume flow and/or mass flow and/or temperature and/or pressure of the gas pressure pulse are measured statically and/or dynamically, whether at the outlet of the turbo-machine of the test object 1, 2, 3 and/or at the inlet and/or outlet of the mechanically coupled second machine 2 (e.g. compressor). As further testing methods, it is also possible via structure-borne noise sensors 16, 17 on the test object 1, 2, 3 and on the coupled machine 2 and optionally via air-borne noise sensors 18 to statically and/or dynamically detect structure-borne noise and/or air-borne noise emissions on one or a plurality of locations on the test object 1, 2, 3 and/or in the test stand. Detecting the structure-borne noise can be carried out with vibration sensors which contact the component or are fixedly installed in the test stand, or with non-contact vibration sensors (e.g. laser or ultrasound).

Although the test object 1, 2, 3, within the testing according to the invention can optionally be operated without lubricant, preferably lubrication with a lubricant adapted to the testing is provided by lubrication system 36, which is fed with constant technical properties. For example, said lubricant can have a different viscosity than the one for the normal operation of the test object and can in particular be heated and/or cooled according to the test requirements by conditioning system 37. Also, the properties and conditions of the lubricant after discharging from the test object can provide additional information about the test object 1, 2, 3 so that at least one measuring device 19 for the mass flow rate and/or volume flow and/or pressure and/or temperature at the lubricant inlet and also a measuring device 20 for the temperature at the lubricant outlet can be provided.

Prior to the rotating test of the test object 1, 2, 3, a flow rate test with air or a test gas is of advantage. Within the test, it is advantageously provided that the volume flow and/or the mass flow of the lubricant supply is statically and/or dynamically recorded and evaluated and also that the temperature of the discharging lubricant can be statically and/or dynamically recorded and evaluated.

The measured values which are automatically collected and stored during the testing of the test object 1, 2, 3 by one or a plurality of measuring and/or control systems can advantageously be checked automatically and immediately by this or these systems or by another independent system for deviations from fixed predefined and/or variable limit values. Depending on the result of this test, the test object 1, 2, 3 can be automatically classified and also marked, for example per marking on the component itself, per print-out or electronically on a data carrier or in a decentralized or central computer. Expediently, the classification is stored and/or displayed with the test results. Another possibility is the automatic evaluation of the test results with regards to possible causes of deviations from the normal state, wherein at the same time additional information on how to eliminate the deviations can be output and stored and/or displayed with the test results. Individual or all recorded measured values and determined test results, after being locally and temporarily stored, can be automatically transmitted by the one or a plurality of measuring and/or control systems to a superordinated computer where they can be saved, evaluated and archived for further evaluations, independently of the production operation at the test stand. Conversely, each of the measuring and/or control systems can automatically retrieve the most current test parameters from a superordinated central computer and can temporarily store them, for example to avoid a production stop during a network outage. It is of course also useful if individual or all test parameters and measurement and evaluation results used are stored in connection with a unique identification marking of the tested component in the local measuring and/or control system and/or in the superordinated computer.

To ensure traceability of all parts, said parts are usually provided with a unique identification marking and all data resulting from the production process are assigned to this identification marking. Optionally, the identification marking can also be virtually assigned at the beginning of the process and can be temporarily stored on suitable storage media (e.g. data carriers of the workpiece carrier or superordinated computer) before the final marking is physically attached to the component during or at the end of the production process (e.g. marking only after the final OK test).

The above described features of the method of testing and of the testing system are also to be viewed in the overall context of quality assurance in the manufacturing process of the turbo-machines. Already today, individual quality checks are integrated in virtually all production processes in high volume productions. In most of the applications, specific error features are checked in these tests—associated with the disadvantage that per definition, errors involving a lower risk are not looked for and therefore are also not detected. The method for quality assurance for turbo-machines in series production described hereinafter reduces the risk of poor error detection in the production process and results in considerable cost savings compared to a complete check (which today is usually not carried out) for specific error features on all individual parts.

Instead of individual tests for specific error features on individual parts, tests of functional units are carried out wherein a large number of possible (and possibly unexpected) failures lead to a test result that deviates from the "normal state". Starting point for the definition of the necessary testing devices is the preparation of a "process FMEA" (Failure Mode and Effects Analysis) which is generally known in development and production planning. In this process, failures to be considered as being critical are filtered out and counter measures for risk minimization are defined. However, for economic reasons, it is in practice almost never possible to avoid all failures (thus also the ones with a lower projected risk) by means of counter measures at the location or in the vicinity of their occurrence.

This is where the new method for quality assurance in the production process begins. In a first step it is first tried to avoid possible failures of high risk at the place or in the vicinity of their occurrence (e.g. through design measures or process improvements). In a second step, the (improved) FMEA analysis is reviewed in order to determine with which test methods and where in the production process each individual failure can be made identifiable. In the third step, it is examined which test methods can detect at which point in the process the widest range of failures and which various test methods can be combined at a certain point of the production process.

A goal here is the definition of the least possible number of testing devices that have to be arranged at "strategically" important points of the production process and virtually act as a "safety net". All in all, the defined testing devices shall be capable to detect a maximum number of different failures—in the ideal case also such failures which "in reality" should not occur.

In the last step, an efficiency analysis of the developed quality assurance concept takes place. This has to include, besides the investment costs for the testing device(s) (which costs can be higher for individual, complex testing devices than for a plurality of simple testing devices), costs for infrastructure (e.g. buildings), utilities and disposal facilities, energy costs, operating costs and especially also maintenance costs (which usually are significantly lower for few central testing devices than for many decentralized testing devices) However, an important factor in the efficiency analysis are the costs for repairing (or destroying) the tested product in the case in which a failure is detected in the testing station. The higher these costs become in the course of the production process, the more likely the efficiency analysis leads to the result to distribute the testing processes over a plurality of devices in the production process.

For the specific application of these principles in the production process of turbo-machines, individual methods known from series production of engines and transmissions in the automotive industry are available, said methods comprising testing all individual parts during and after completion of the manufacturing process for compliance with the required physical properties, avoiding selection and installation errors through poka-yoke methods, monitoring manufacturing and installation processes (e.g. tool monitoring in manufacturing machines, force/travel monitoring of joining processes, torque/rotation angle monitoring of screwing processes, application control of liquid seals), checking partially or completely installed assemblies for completeness, leaks, friction forces, contacts and function, checking the completely or largely completely installed end product for completeness, leaks, friction forces, contacts and function without operating it under normal operating conditions (as described above in detail), and testing the completely or largely completely installed end product for completeness, leaks, friction forces, contacts, function, performance and emission under normal operating conditions—as a 100% check for setting performance and emission and testing performance and emission, or as quality control within a statistical process control (SPC)—on a special performance test stand or installed in the end product.

According to the results of the efficiency analysis, the necessary, reasonable and economically feasible test methods from the aforementioned methods are selected. The goal here is to detect the highest possible number of possible failures with the lowest possible number of testings. Of particular importance is the check of the partially to completely installed assemblies and end products for completeness, leaks, friction forces, contacts and function. Subsequently, a seamless integration into the provided production process takes place.

It is particularly advantageous here if the testing of the completely or largely completely installed end product for completeness, leaks, friction forces, contacts, function, performance and emission is performed under normal operating conditions for setting performance and/or emission and/or for testing performance and emission (100% testing), or is performed only as quality control within a statistical process control (SPC) on a portion of the total quantity produced.

The invention claimed is:

1. A method for functional testing of a test object containing a rotatable member, said method comprising the steps of:
   (a) providing a test stand having a gas supply line;
   (b) positioning the test object in the test stand and connecting the gas supply line to the test object;
   (c) commencing with no flow of gas in the gas supply line, delivering a gas pressure pulse through the gas supply line to rotate the rotatable member of the test object, with gas flow in the gas supply line thereafter returning to no flow, and
   (d) detecting dynamic behavior of the test object with rotating rotatable member to determine functional faults thereof.

2. The method according to claim 1, wherein in step (c) gas flow in the gas supply line alternates between no flow of gas and flow of gas for delivering at least two gas pressure pulses through the gas supply line.

3. The method according to claim 2, wherein two of the at least two gas pressure pulses have differing energy content.

4. The method according to claim 1, wherein the test stand includes a valve in the gas supply line, and including a step of operating the valve in step (c) to provide at least one gas pressure pulse.

5. The method according to claim 4, wherein the test stand includes a tank containing pressurized gas, and including a step of feeding said pressurized gas to said gas supply line.

6. The method according to claim 4, wherein the test stand includes a throttle in the gas supply line, and including a step of operating the throttle to reduce gas flow through the gas supply line.

7. The method according to claim 1, wherein the test stand includes a measuring and control system, and including the steps of measuring at least one of volume flow, mass flow, temperature and pressure of gas flow in the gas supply line.

8. The method according to claim 1, wherein the test object includes a gas intake and a gas discharge, and wherein in step (b) the gas supply line is connected to the gas Intake so that the rotatable member in the test object rotates in a normal direction.

9. The method according to claim 8, wherein the test stand includes a measuring and control system, and including the steps of measuring one of volume flow, mass flow, temperature and pressure of the gas flow at the gas discharge, and forwarding the measured values to the measuring and control system.

10. The method according to claim 8, wherein the test stand includes a throttle at the gas discharge, and wherein the gas flow from the gas discharge is reduced by the throttle.

11. The method according to claim 1, wherein the test object includes a gas Intake and a gas discharge, and wherein in step (b) the gas supply line is connected to the gas discharge so that the rotatable member therein rotates in a direction opposite to normal.

12. The method according to claim 11, wherein the test stand includes a measuring and control system, and including the steps of measuring one of volume flow, mass flow, temperature and pressure of the gas flow at the gas discharge, and forwarding the measured values to the measuring and control system.

13. The method according to claim 11, wherein the test stand includes a throttle at the gas discharge, and wherein the gas flow from the gas discharge is reduced by the throttle.

14. The method according to claim 1, wherein the test stand includes a lubricant supply device, and Including a step of supplying lubricant to the test object.

15. The method according to claim 14, wherein the test stand includes a measuring and control system, and including the steps of measuring at least one of volume flow, mass flow and temperature of the lubricant flow, and forwarding the measured values to the measuring and control system.

16. The method according to claim 1, wherein the test stand includes a speed sensor or rotation angle sensor, and including a step of detecting rotational characteristics of the rotatable member.

17. The method according to claim 1, wherein the test stand includes a measuring and control system and an air-borne noise sensor, and including the steps of detecting air-borne noise values generated by the test object when the rotatable member thereof is rotating, and forwarding detected values to the measuring and control system.

18. The method according to claim 1, wherein the test stand includes a measuring and control system and a structure-borne noise sensor, and including the steps of detecting structure-borne noise in the test object when the rotatable member thereof is rotating, and forwarding detected values to the measuring and control system.

19. The method according to claim 1, wherein the test object comprises a turbine.

20. The method according to claim 1, wherein the test object comprises a turbine connected to a compressor by a rotatable shaft.

21. A testing apparatus for determining functional faults in a test object containing a rotatable member, said testing apparatus comprising:
   a receptacle for receiving the test object,
   source means for providing pressurized gas,
   a gas supply line for delivering pressurized gas from said source means to the test object in said receptacle, valve means for controlling flow of pressurized gas through said gas supply line, such that with the valve means closed and no flow of pressurized gas through the gas supply line, the valve means can be opened and closed to deliver at least one pulse of pressurized gas to the test object, with the flow of pressurized gas through the gas supply line being discontinued after each pulse, measuring means for detecting physical values related to dynamic behavior of the test object in the receptacle when subjected to the at least one pulse of pressurized gas, and an evaluation unit for evaluating the detected physical values and determining functional faults.

22. The testing apparatus according to claim 21, including heating means for heating the pressurized gas in the gas supply line.

23. The testing apparatus according to claim 21, including a throttle means in said gas supply line.

24. The testing apparatus according to claim 23, including a gas discharge line for removing gas from a test object in said receptacle.

25. The test apparatus according to claim 24, including an additional throttle means in the gas discharge line.

26. The testing apparatus according to claim 24, including a measuring and/or control system for receiving the detected physical values.

27. The testing apparatus according to claim 26, wherein said measuring means includes a first set of detectors for measuring at least one of volume flow, mass flow, temperature and pressure of gas flow in the gas supply line.

28. The testing apparatus according to claim 27, wherein said measuring means includes a second set of detectors for measuring at least one of volume flow, mass flow, temperature and pressure of gas flow in the gas discharge line.

29. The testing apparatus according to claim 21, including a lubricant supply means for delivering lubricant to a test object in said receptacle.

30. The testing apparatus according to claim 29, including a third set of detectors for measuring volume flow, mass flow, temperature and pressure of lubricant delivered to the test object in said receptacle.

31. Testing apparatus according to claim 21, wherein said measuring means includes noise and vibration detectors.

* * * * *